Feb. 23, 1932.  H. CASLER ET AL  1,846,414
BRAKE TESTING DEVICE
Filed Oct. 20, 1928  3 Sheets-Sheet 1
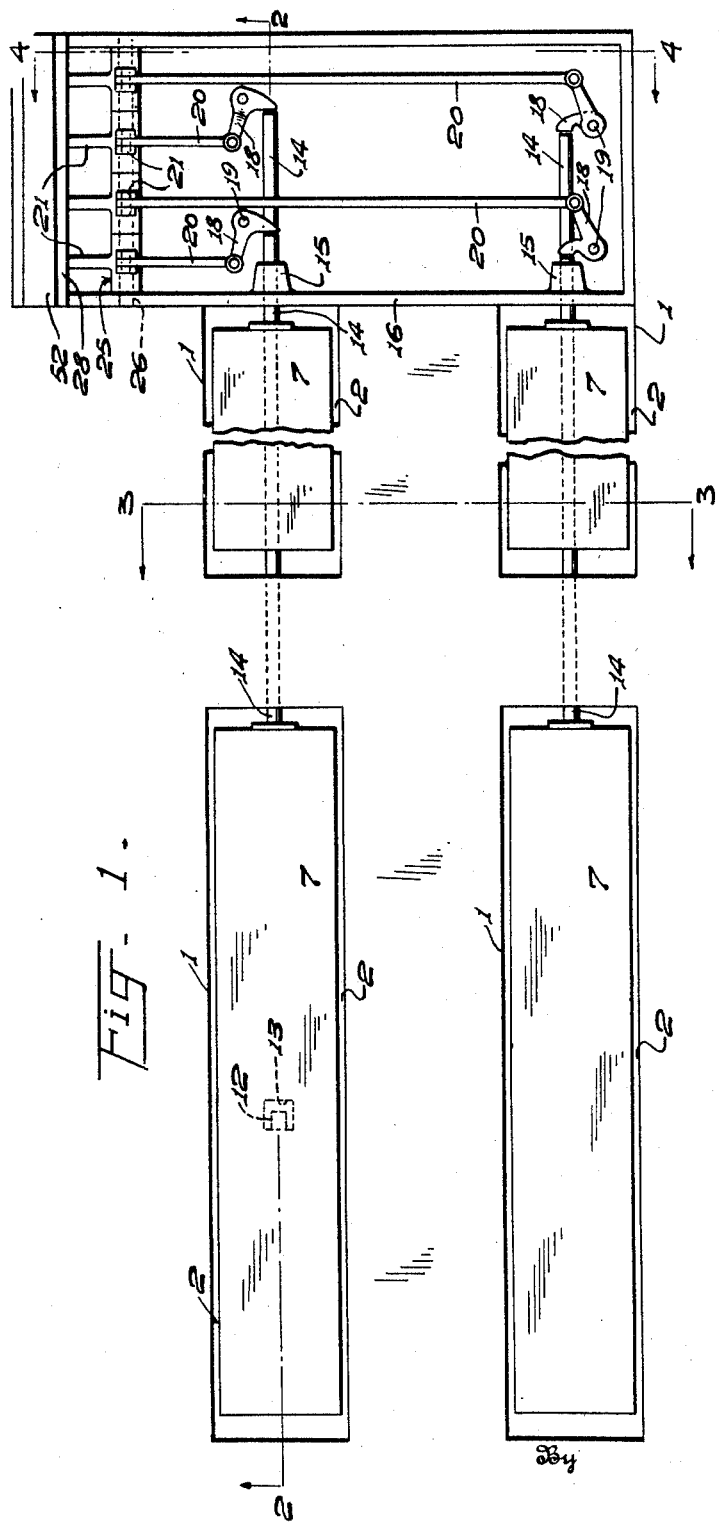
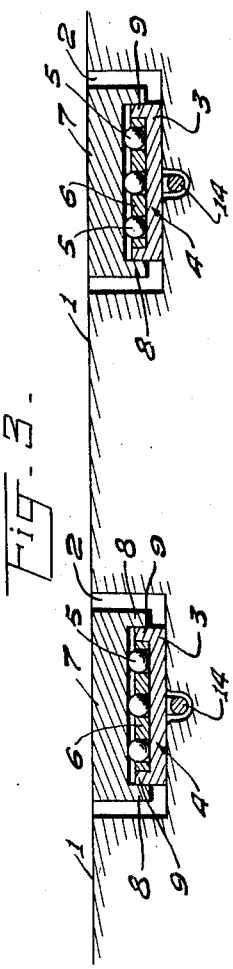
Inventors
HERMAN CASLER
CHARLES P. GRIMES
By Percy H. Moore
Attorney

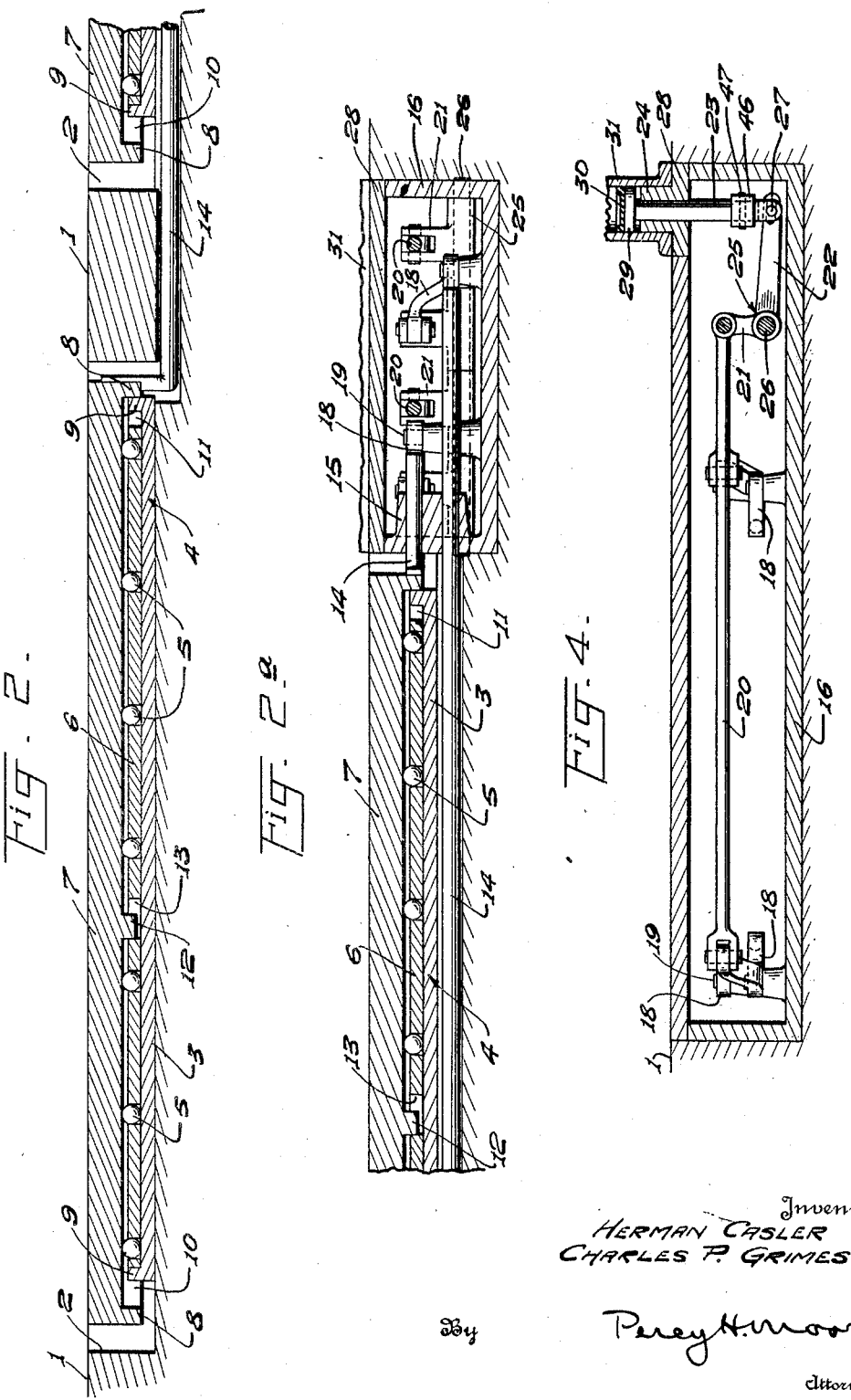

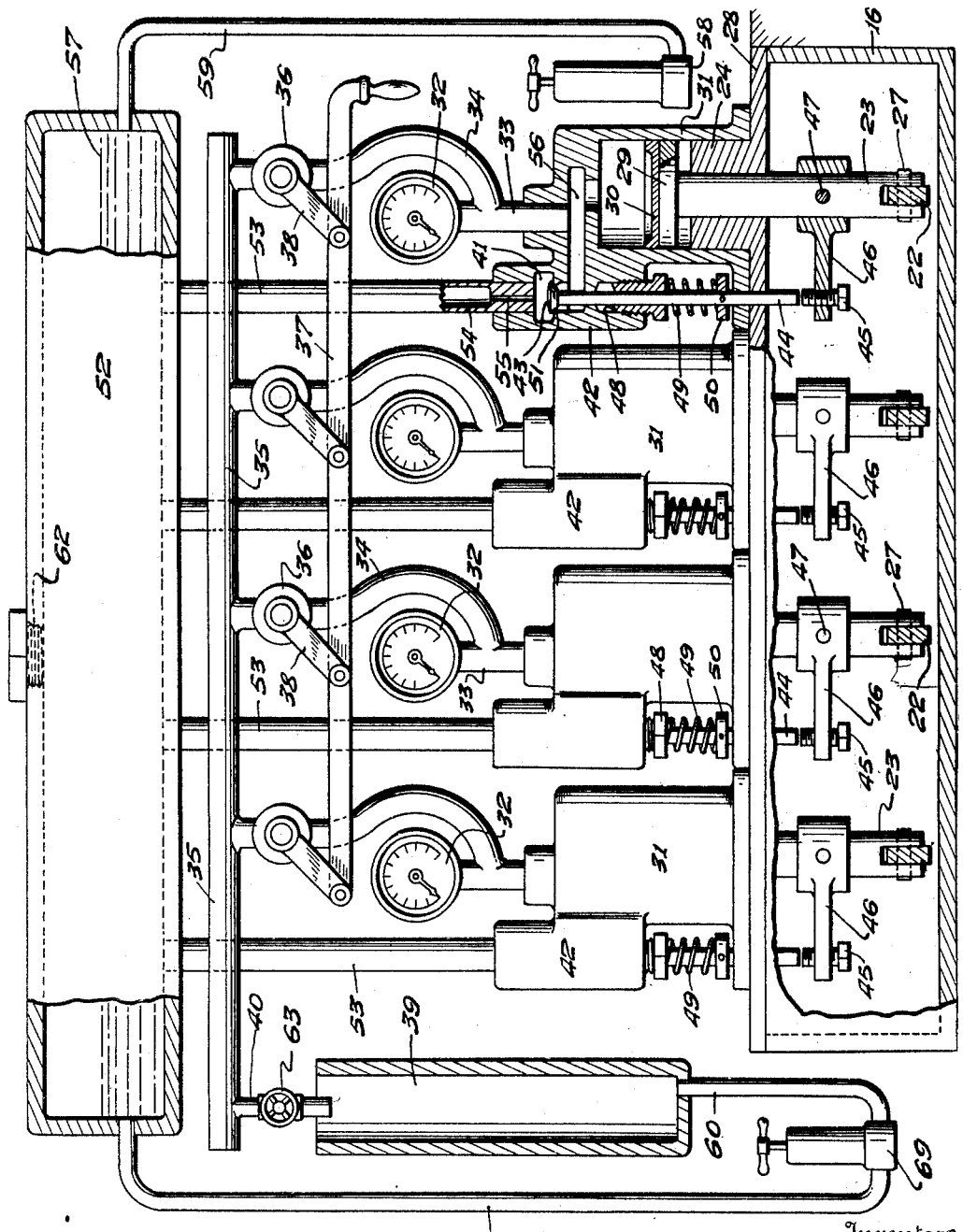

Patented Feb. 23, 1932

1,846,414

UNITED STATES PATENT OFFICE

HERMAN CASLER, OF CANASTOTA, AND CHARLES P. GRIMES, OF SYRACUSE, NEW YORK

BRAKE-TESTING DEVICE

Application filed October 20, 1928. Serial No. 313,788.

Our invention relates to apparatus for testing motor vehicle brakes and has for its object to provide a simple device of this nature by means of which it will be possible to accurately determine the relative brake resistance of the respective wheels.

Other objects and advantages of the invention will be apparent as the description is considered in connection with the accompanying drawings, in which:

Figure 1 is a plan view of the invention;

Figure 2 is a section on the line 2—2 of Figure 1;

Figure 2a is a section on the line 2a—2a of Figure 1;

Figure 3 is a section on the line 3—3 of Figure 1;

Figure 4 is a section on the line 4—4 of Figure 1; and

Figure 5 is an enlarged elevation partly in section, showing the gauge mechanism.

Referring more particularly to the drawings wherein like reference numerals refer to corresponding parts throughout the several views 1 denotes the concrete floor of a garage or other building in which the device is installed. Preferably the mechanism of the device is located in a suitable recess or cavity 2 so that the top of the device will be flush with the top of the floor. However, if deemed desirable the device may be mounted directly upon the floor, in which case, inclined approaches or ramps (not shown) would be employed.

In the embodiment illustrated base plates 3, four in number, mounted in cavities 2, support ball bearing frames 4, each comprising a plurality of anti-friction ball bearings 5 held in spaced relation by plates 6. These ball bearings support movable top plates or platforms 7, four in number, one for each ball bearing frame 4 and base plate 3, provided with side flanges 8 fitting over corresponding end flanges 9 formed upon the base plates. It will be noted that the flanges 8 and 9 cooperate to prevent dirt from collecting on the bearings 5 between the movable plates and the base plates.

When the movable top plates are in normal or Figure 2 position there will be a space or clearance 10 between the respective rear end flanges 8 and 9 of the top plates and base plates 3, the purpose of which is to permit the top plates to move forwardly under the load of a vehicle. For a similar purpose a clearance or space 11 is provided between the forward ends of the roller bearing plates 6 and the forwardmost end flanges 9 of the base plates 3. A lug 12 depending from each top plate engages loosely within an opening 13 in the ball bearing plates 6, and serves to keep the ball bearings and their plates in their normal or Figure 2 position, relatively to the base plate. Movement of the top plates with respect to the movement of the ball bearing frames will be at a ratio of 2 to 1, that is, when the top plates are carried forward a distance of two inches under the load of a vehicle, the ball bearings 5 and plates 6 will be moved in a corresponding direction a distance of one inch. In other words the ball bearing frames travel one half as far as the movable plates. As the construction and mounting of the four movable plates or platforms 7 and the gauges and gauge mechanism for each is identical the description will be limited to the left rear platform and its associated parts.

Connected at its rear end to the forward end of the movable top plate or platform 7 is a plunger 14 supported in bearings 15 and extending at its forward end into a box 16 provided with a cover or base plate 28. The plunger 14 engages one arm of bell crank lever 18, pivotally mounted as at 19 in the box 16, the other arms of the bell crank being pivotally connected to one end of connecting rod 20, the other end of which is connected to arm 21 of bell crank lever 25, pivotally mounted in the box 16, as at 26. The other arm 22 of the bell crank 25 is pivotally connected by cross pin 27 to piston rod 23, mounted for vertical movement in bearing 24 in base plate 28. On the upper end of the piston rod 23 is a piston 29 to which is attached a cup shaped washer 30 operating in cylinder 31 also mounted on the base plate 28, it being understood that each of the platforms 7 is thus connected to its respective piston rod 23 and associated mechanism, so that when the drag of the vehicle wheel tends to carry the movable platform forward, the latter will act to raise the piston rod 23 and piston 29.

A pressure gauge 32 such as is used on steam boilers is in communication with the interior of cylinder 31, above the piston 30, by means of tube 33, for recording the pressure built up in cylinder 31 and tubes 33 and 34. A branch tube 34 in communication with and connected at its lower end to the tube 33, is connected at its upper end to manifold 35. Rotary valve 36 mounted in branch tube 34 controls the flow of liquid or other pressure medium employed through the branch tube. Manipulation of the valve 36 to open or closed position is manually effected by means of a horizontally disposed bar 37 connected to the valve by arm 38. Movement of the bar 37 to the left, Figure 5, causes a corresponding movement of the valve arm 38, and the latter in turn rotates the valve 36 to normal closed position. The manifold 35 communicates with a storage tank 39 adapted to receive the liquid as it passes through the system, the manifold being provided with a valved outlet 40 for this purpose.

Mounted in a chamber 41 in an offset or enlargement 42 formed on one side of the cylinder 31 is a check valve 43. The stem 44 of valve 43 projects downwardly through the base plate 28 into the path of movement of a set screw 45, carried by arm 46 in turn secured as at 47 to piston rod 23. A packing gland 48 prevents leakage of liquid along the stem of the check valve, and a compression spring 49 confined between the gland 48 and a collar 50 on the valve stem normally pulls the valve 43 to its seat 51. The chamber 41 is placed in communication with a liquid supply tank 52 by means of a perpendicularly disposed tube 53 depending from the tank and connected at its lower end with the chamber at a point slightly above the check valve 43 when the latter is held to its seat 51 by the spring 49. Chamber 41 also communicates with the interior of the cylinder 31 above the piston 29, through a cross passage 56. The lower end of the opening 54 in tube 53 terminates in a restricted passage 55 adapted to prevent such a sudden inrush of liquid as would create a much greater pressure than necessary in cylinder 31 to overcome the thrust of the movable platform.

The liquid pressure tank 52 is filled with liquid such as oil to a level indicated at 57 in Figure 3, however any suitable liquid may be employed or by making slight changes compressed air or a gas may be used. A hand air pump 58 connected to the tank 52 by tube 59 may be employed to keep the liquid in tank 52 under pressure and a liquid hand pump 69 connecting with the storage tank 39 and pressure tank 52 respectively through tubes 60 and 61 serves as a means for transferring accumulated liquid from tank 39 to tank 52.

Assuming that a proper amount of liquid has been run into tank 52, through opening 62 and a pressure created in the tank by compressed air supplied from pump 58, the pressure forces the liquid down through tube 53 to the check valve 43. By operating the platform plates manually, with the bar 37 moved to the right, Figure 5, to open rotary valve 36, the liquid will flow through the system filling the cylinder 31, tube 34, manifold 35 and finally escaping to storage tank 39 through valve 63. When the system has been thus filled with liquid and the bar 37 moved to the left closing the valve 36, the apparatus is ready for operation as follows:

The vehicle is driven over the movable platforms and the brakes applied at the moment each wheel reaches its respective platform. The drag of the left rear wheel on the left rear platform 7 causes the piston 29 to rise thereby compressing the air in gauge 32. At the same time the set screw 45 is elevated into contact with the stem 44 of check valve 43, the raising of which allows the liquid under pressure to flow around the valve seat 51 and through passage 56 to the cylinder 31, thus causing the piston 29 to descend until the set screw 45 breaks contact with the valve stem 44, thus permitting valve 43 to move downwardly to closed position under the action of spring 49. After the vehicle comes to rest the various gauges 32 will indicate the pressure required in cylinders 31 to overcome the thrust of the movable platforms due to the drag of the respective vehicle wheels thereon. The gauges will remain stationary until such time as the bar 37 is moved to the right to open the valve 36, thus allowing a small portion of the liquid to escape from tubes 34 by reason of the expansion of the air in the gauges. Continued operation of the device causes the liquid released by the valves 36 to accumulate in the storage tank 39. When a quantity of liquid, thus escaping from tank 52, has accumulated in tank 39 it can be transferred to tank 52, by means of the pressure pump 69 and connections 60 and 61.

It will be understood that the small quantity of air trapped in the gauges when the system is originally filled with liquid, will compress sufficiently under a light load to allow sufficient movement of piston 29 to operate valve 43.

Having thus described our invention, what we claim is:

1. A device for testing brakes used on vehicles and the like comprising a movable plate adapted to be overrun and shifted by a vehicle wheel while moving over said plate with brakes applied, liquid pressure actuated means opposing the movement of said plate, a pressure gauge connected to said liquid pressure actuated means, a storage reservoir containing liquid under pressure having a passage leading to said liquid pressure actuated means, a self closing relief valve for said storage reservoir located in said passage, means operatively connecting said relief valve and said movable plate whereby said valve will be opened by the thrust of said plate and will close upon the recession of said plate when the pressure in said liquid pressure actuated means is sufficient to counteract the thrust of said plate whereby said gauge will register the opposing force necessary to counteract the thrust of said plate.

2. A testing device for brakes used on vehicles comprising a plate adapted to be actuated by the retarding force induced by the application of a brake on a moving vehicle as said vehicle moves over said plate with its wheel in contact with said plate, a storage of potential energy comprising a supply of liquid under pressure, means connected to said plate adapted to release said potential energy to counteract the thrust of said plate to the extent to counteract the retarding force induced by said brake and means adapted to measure said counteracting force.

In testimony whereof we affix our signatures.

HERMAN CASLER.
CHARLES P. GRIMES.